(12) United States Patent
Evans et al.

(10) Patent No.: US 7,889,743 B2
(45) Date of Patent: Feb. 15, 2011

(54) INFORMATION DISSEMINATION METHOD AND SYSTEM HAVING MINIMAL NETWORK BANDWIDTH UTILIZATION

(75) Inventors: Scott C. Evans, Burnt Hills, NY (US); Harold T. Tomlinson, Ballston Spa, NY (US); Ping Liu, Clifton Park, NY (US); Ishan P. Weerakoon, Rockvillle, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 398 days.

(21) Appl. No.: 11/785,720

(22) Filed: Apr. 19, 2007

(65) Prior Publication Data
US 2008/0259927 A1   Oct. 23, 2008

(51) Int. Cl.
*H04L 12/56* (2006.01)
(52) U.S. Cl. .................. 370/394; 370/389; 370/351
(58) Field of Classification Search ......... 370/389–394, 370/412–418, 351
See application file for complete search history.

(56) References Cited

U.S. PATENT DOCUMENTS

| 6,438,134 | B1 | 8/2002 | Chow et al. |
| 7,359,370 | B1* | 4/2008 | Renkel et al. ............... 370/352 |
| 2002/0126690 | A1 | 9/2002 | Narayana et al. |
| 2002/0178282 | A1 | 11/2002 | Mysore et al. |
| 2003/0050954 | A1 | 3/2003 | Tayyar et al. |
| 2006/0067213 | A1 | 3/2006 | Evans et al. |
| 2007/0064716 | A1* | 3/2007 | Sachs et al. ................. 370/412 |
| 2007/0297417 | A1* | 12/2007 | Cohen et al. ........... 370/395.42 |

FOREIGN PATENT DOCUMENTS

EP     0 981 228 A2    2/2000

OTHER PUBLICATIONS

Ahsan et al, Practical Data Hiding in TCP/IP, Workshop Multimedia and Security at ACM Multimedia 2002, Dec. 6, 2002.*
Evans, Scott C. et al;. Route Based QoS and the Biased Early Drop Algorithm (BED); Proceedings on the $2^{nd}$ International Conference on Quality of Service in Heterogeneous Wired/Wireless Networks, 2005 IEEE; Aug. 22-24, 2005.

(Continued)

*Primary Examiner*—Pankaj Kumar
*Assistant Examiner*—Gautam Sharma
(74) *Attorney, Agent, or Firm*—Oliff & Berridge, PLC

(57) ABSTRACT

An information disseminating apparatus that transmits information between nodes of a network while expending minimal or no network bandwidth for transmitting the information. The apparatus can include a message processor that generates or receives a message to be transmitted from a first note to a second node in the network, and a transmitter that transmits data packets in a sequence that represents the message from the first node to the second node. The apparatus may further include a plurality of queues each associated with a class and services one or more data packets each having a marker that corresponds to the class, and a queue processor that dequeues the data packets from the queues in accordance to the sequence and the class associated with each of the queues.

20 Claims, 14 Drawing Sheets

OTHER PUBLICATIONS

Evans, Scott C. et al., Adaptive Statistical QoS: Learning Parameters to Maximize End-to-End Network Good-put; Military Communications Conference, 2006. MILCOM 2006; Oct. 23-25, 2006; pp. 1-7.

Liu, Ping et al; Qualifying Bandwidth Gain of Triage QoS Protocol and Mobility Effects; Military Communications Conference, 2006. MILCOM 2006; Oct. 23-25, 2006; pp. 1-6.

Evans, Scott C. et al. End-to-End QoS Through Distress Biased Services: A Triage Approach; Military Communications Conference, 2006. MILCOM 2006; Oct. 17-20, 2005.

Kundur, Deepa; Workshop Multimedia and security at ACM Multimedia' 02: Practical Data Hiding in TCP/IP; Dec. 6, 2002; pp. 1-8, XP002487955.

* cited by examiner

**TRAFFIC GRAMMARS FOR OVERHEAD
FREE NETWORK TRAFFIC MANAGEMENT:
WEIGHTED CODED QUEUING (WCQ)**

WFQ:        1101110111011101110111011101110
$WCQ^0$:    00000000111111111111111111111111
⋮
$WCQ^1$:    00111111001111110011111100111111
$WCQ^2$:    10011111100111111001111110011111
⋮
$WCQ^N$:    01111011011110110111101101111011

INFORMATION DISSEMINATION METHOD AND SYSTEM HAVING MINIMAL NETWORK BANDWIDTH UTILIZATION

BACKGROUND

Communication network overhead information, such as route cost updates, message acknowledgements, congestion control notifications, and other network statistics and management information are transmitted between network nodes in a communication network to facilitate network traffic management. However, such transmission of network overhead information expends network bandwidth that could otherwise be used to send actual data and other mission critical data payloads.

Presently, the bandwidth of communication networks are over-provisioned to provide room for the transmission of network overhead information. Various strategies and algorithms have also been developed in attempts to decrease bandwidth consumption by the transmission of network overhead information required to facilitate network traffic management. The problem remains, however, that present techniques for exchange of network overhead information require network bandwidth that could be used to send actual data and other mission critical data payloads through the communication network.

SUMMARY

Disclosed herein are methods and systems for implementing a protocol for disseminating information by sequencing a plurality of data units (e.g., data packets) each having a marker (e.g., a service class, a source address, a destination address, and the like) in communication networks that expends minimal or no network bandwidth. In packet-switched communication networks, such as the Internet and mobile ad hoc network (MANET) implemented using Internet Protocol (IP), the disclosed protocol may disseminate information, including network overhead information, by encoding and transmitting the information in a specific sequence of marked data packets or identifiable classes of data packets.

An embodiment of the data dissemination protocol may be implemented upon or extend various computer networking architectures and techniques, such as Differentiated Services and/or Weighted Fair Queuing. Differentiated Services is a computer networking architecture for managing network traffic that specifies a scalable class-based mechanism for classifying data packets in the network traffic into identifiable classes and for differentiating quality of service for the data packets based on the associated per-hop behavior and other characteristics of the data packets.

Exemplary service classes may include, for instance, expedited forwarding for low-loss and low-latency services, best-effort forwarding for non-critical services, assured forwarding for non-time-sensitive services, etc. Differentiated Services and/or other network service classification techniques may be used to associate data packets with identifiable classes that enable the aforementioned embodiment of the data dissemination protocol to transmit information while expending minimal or no network bandwidth.

A further embodiment of the data transmission protocol may extend a data packet scheduling technique, such as Fair Queuing and Weighted Fair Queuing. Both provide separate first-in, first-out queues for statistically multiplexing one or more data flows of the network traffic. One or more of the queues may be assigned the task of processing one or more classes of the identifiably classified data packets in the network traffic. Weighted Fair Queuing allows different queues to be assigned different service shares for controlling the quality of service and to achieve guaranteed data rate.

The aforementioned embodiment of the data transmission protocol may extend a data packet scheduling technique, such as Fair Queuing or Weighted Fair Queuing, to disseminate information while expending minimal or no network bandwidth by encoding and transmitting the information in a specific sequence of marked data packets or identifiable classes of data packets.

BRIEF DESCRIPTION OF THE DRAWINGS

The preferred embodiments of the present invention will be described with reference to the following drawings, wherein like numerals designate like elements, and wherein.

DETAILED DESCRIPTION OF EMBODIMENTS

Reference will now be made in detail to embodiments of the invention, examples of which are illustrated in the accompanying drawings. Wherever possible, the same reference numbers will be used throughout the drawings to refer to the same or like parts.

As described above, aspects of the pre, sent invention can provide methods and systems for implementing a protocol that disseminate information in communication networks that expends minimal or no network bandwidth. Specifically, in packet-switched communication networks, such as the Internet and mobile ad hoc network (MANET) implemented using Internet Protocol (IP), the disclosed protocol may disseminate information, including network overhead information, by encoding and transmitting the information in a specific sequence of marked data packets or identifiable classes of data packets.

Figure 1:
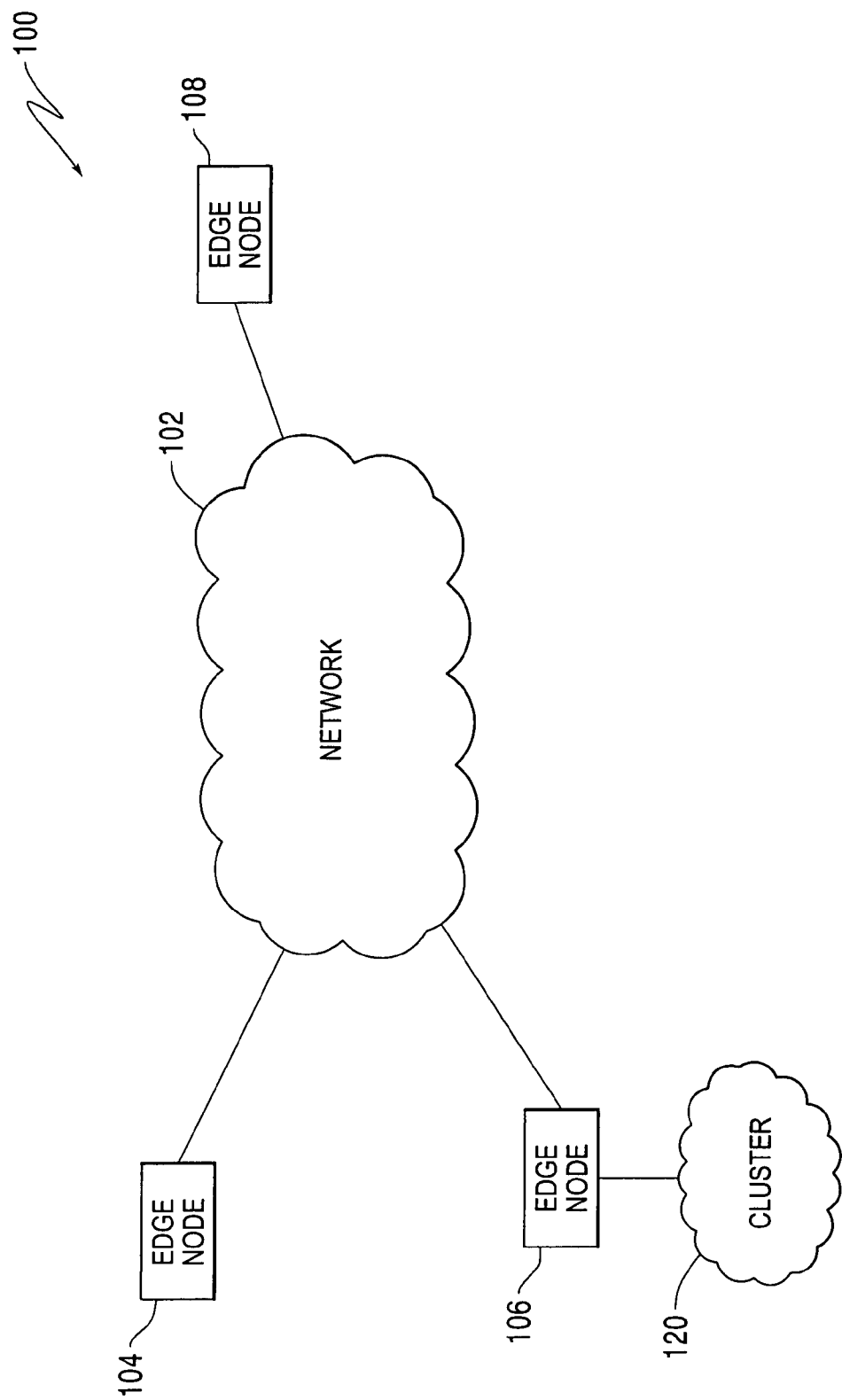
FIG. 1 is an exemplary diagram of a communication network.

FIG. 1 shows an exemplary diagram of a communication network system 100 that includes a communication network 102 and edge nodes 104-108. Network 102 includes a cluster of network nodes, and may be a data network (e.g., Internet, intranet, wide area network (WAN), local area network (LAN), and the like), a telecommunication network (e.g., MANET, general packet radio service network, i-mode service network, and the like), or any of a variety of packet-switching communication networks (e.g., IP networks and the like) that facilitates communication between edge nodes 104-108. Edge nodes 104-108 may be user nodes (e.g., terminals, client nodes, mobile communication devices, voice over Internet Protocol (VOIP) devices, and the like), intermediate nodes (e.g., gateways, proxies, and the like), or other communication nodes. For example, edge node 106 may serve as a gateway for a cluster 120 of network nodes in network system 100.

Figure 2:
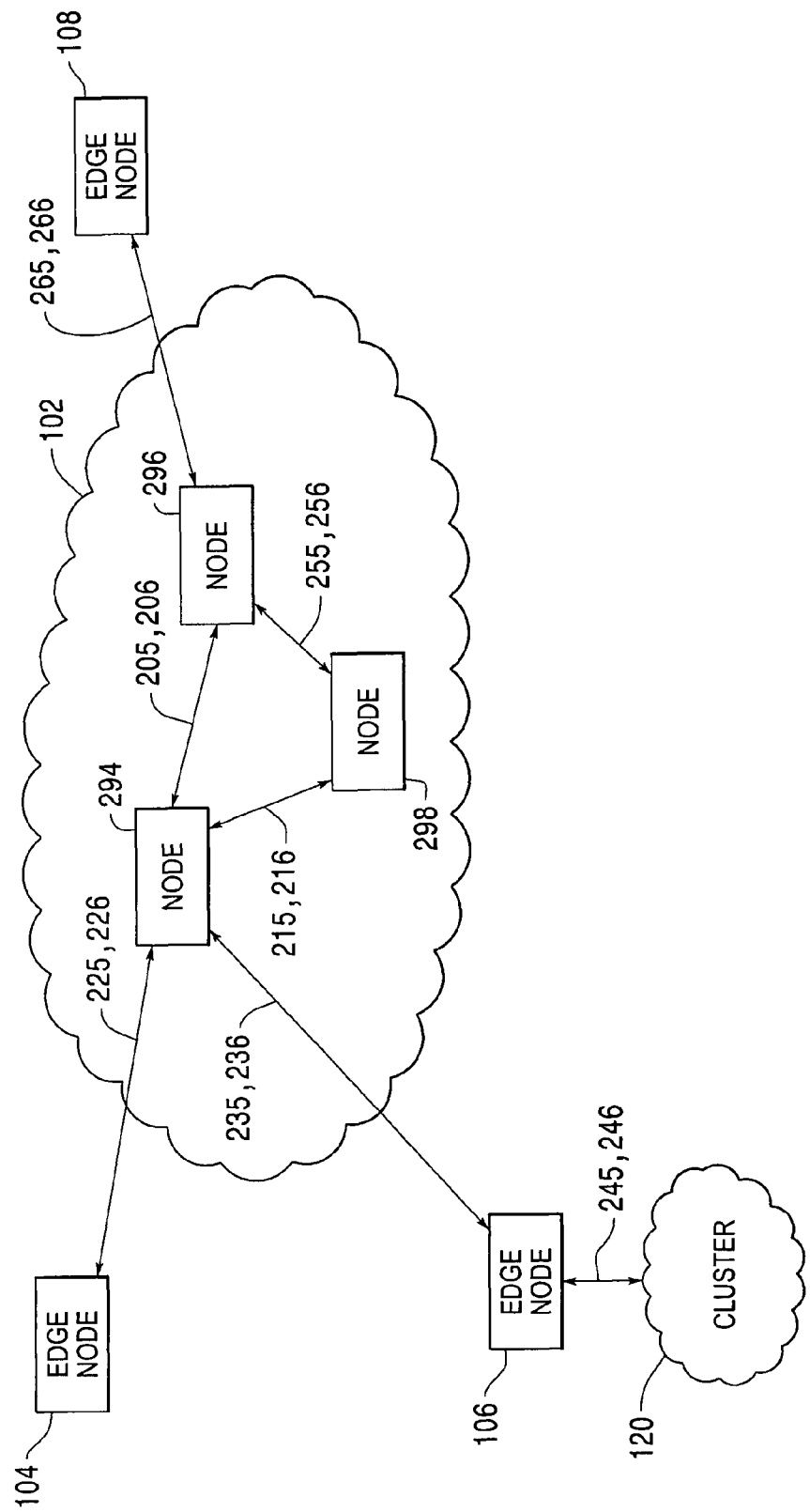
FIG. 2 is an exemplary diagram of the network in FIG. 1 with further detail.

FIG. 2 shows an exemplary diagram of communication network system 100 which includes an exemplary cluster of network nodes 294-298 in communication network 102. FIG. 2 is similar to FIG. 1, and corresponding elements are designated by like reference numerals. Network nodes 294-298 may be core nodes (e.g., gateways, proxy servers, and the like), intermediate nodes, or other communication nodes. Network node 294 is coupled, within network 102, to network node 296 via communication links 215-216 and to network node 298 via communication links 225-226; network 294 is also coupled to edge nodes 104 and 106 outside of network 102 via communication links 225-226 and 235-236, respectively. Edge node 106 is coupled to cluster 120 via communication links 245-246. Network node 296 is coupled, within network 102, to network node 298 via communication links 255-256; network 296 is further coupled to edge node 108 outside of network 102 via communication links 265-266. Communication links 205, 215, 225, and 235 are input into network node 294, and communication links 206, 216, 226, and 236 are output from network node 294. From the perspective of network node 294, data packets (or other forms of communication signal) are received from communication links 205, 215, 225, and 235, and each of the received data packets is destined to one of edge nodes 104-108, cluster 120, and network nodes 296-298.

Figure 3:
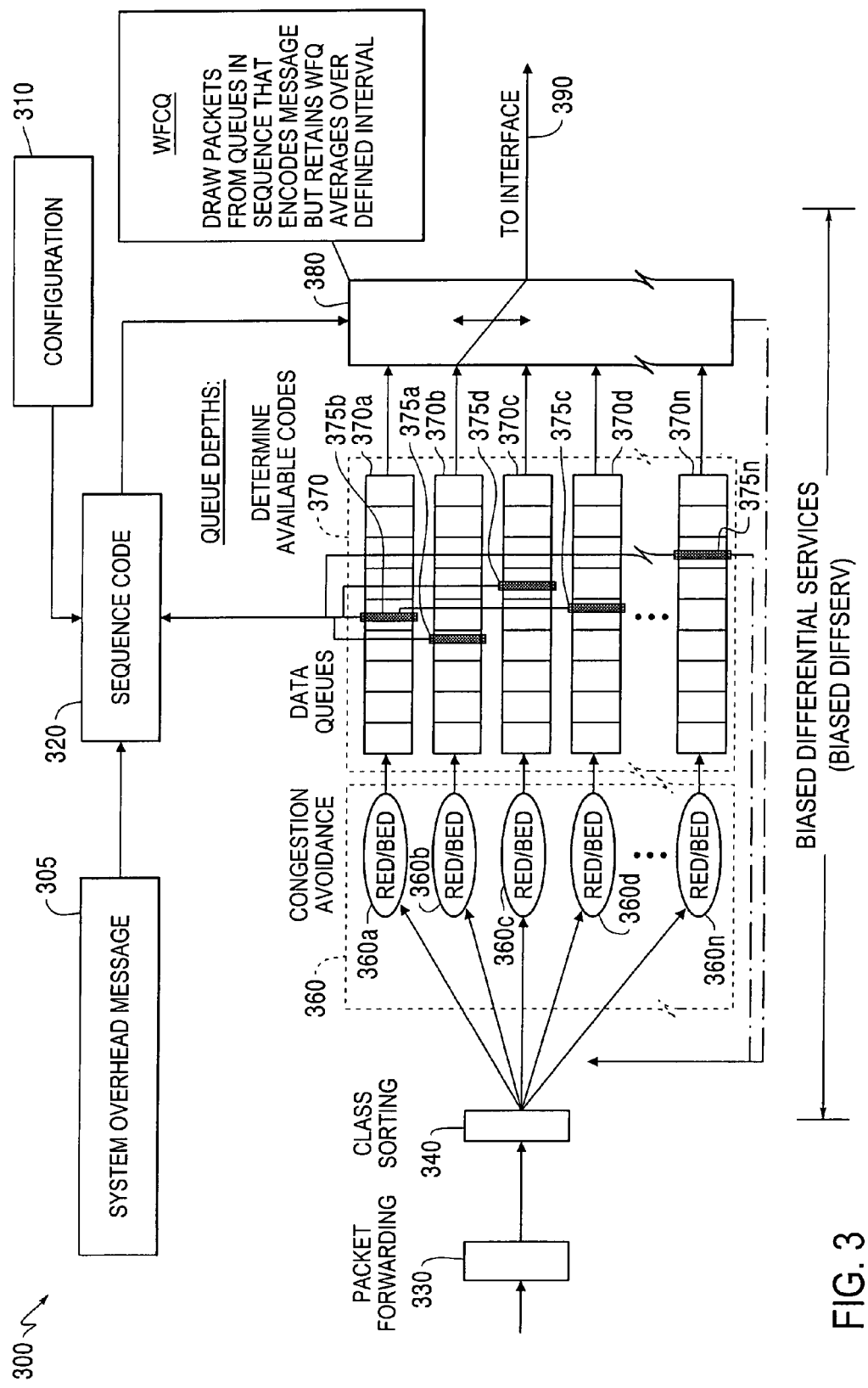
FIG. 3 illustrates a simplified block diagram of an exemplary network node for sending data packets in an encoded sequence in a network system.

FIG. 3 illustrates a simplified block diagram of an exemplary network node 300 in network system 100. Network node 300 illustrates the general structure of a network traffic manager according to an exemplary aspect of the invention, which may be implemented in network nodes 294-298 in network 102, edge nodes 104-108, and/or network nodes in cluster 120. Network node 300 applies various network traffic management techniques, such as Differentiated Services (DiffServ) and/or Weighted Fair Queuing (WFQ).

DiffServ, which is a computer networking technique for managing network traffic, specifies a scalable class-based mechanism for classifying data packets in the network traffic into identifiable service classes and for indicating priority (e.g., quality of service (QoS)) of the data packets relative to other data packets based on associated per-hop behavior (e.g., DiffServ Code Point) and other characteristics of the data packets. QoS utilizes control mechanisms that provide different levels of service to different network users or classes of data packets in the network traffic.

A data packet in the network traffic may be classified by various parameters, including the data packet's source address, destination address, service class, and the like. Depending on the classification scheme, the data packet may be marked, identified, or otherwise indicated as being associated with one of the classes defined in the classification scheme based on the data packet's parameter or parameters. In an exemplary embodiment, network node 300 implements DiffServ, and classifies data packets in accordance to their service classes. Exemplary service classes may include a predefined set of service priorities, such as expedited forwarding, best-effort forwarding, assured forwarding, and the like.

Figure 4:
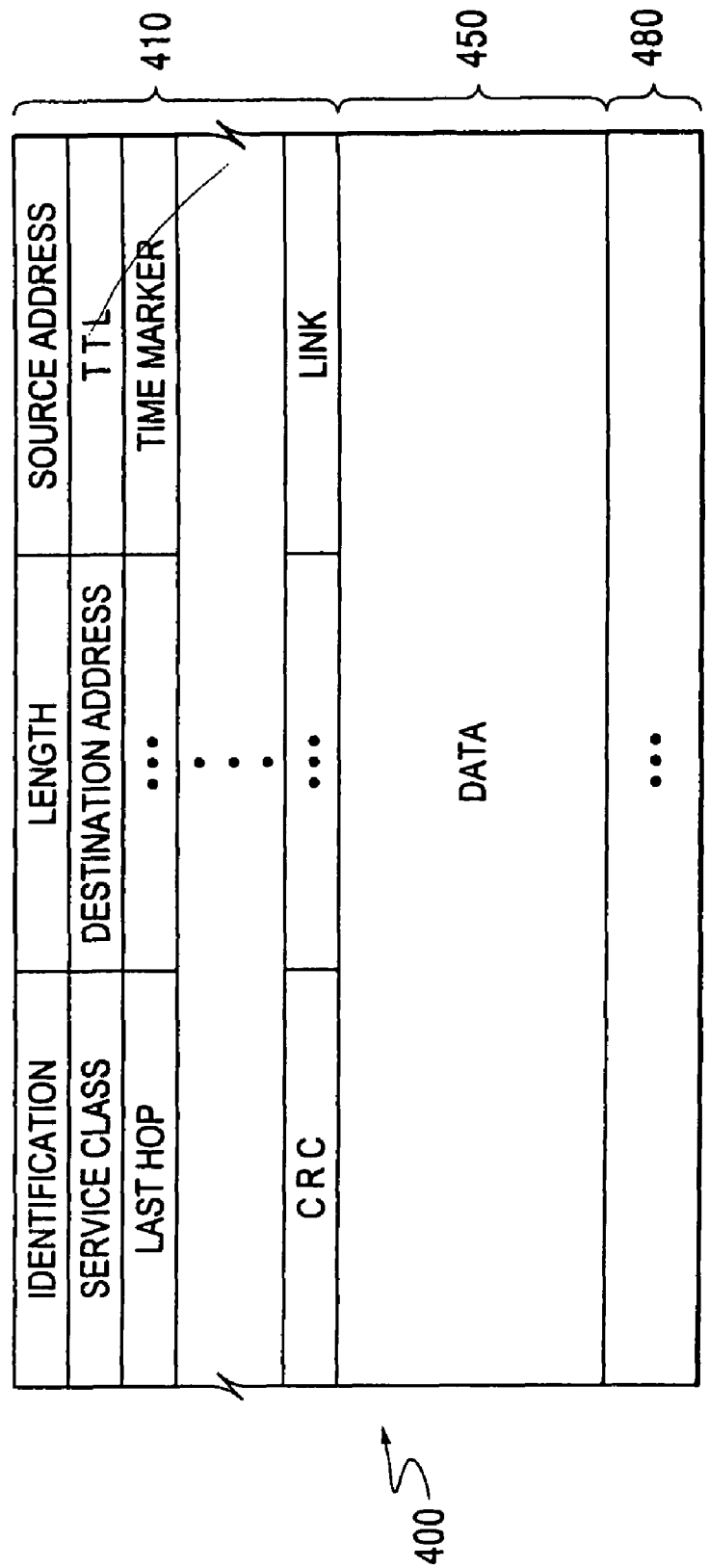
FIG. 4 illustrates an exemplary data packet in accordance with the invention.

As shown in FIG. 4, an exemplary data unit (e.g., a data packet 400) may contain a header portion 410, a data portion 450, and a trailer portion 480. Trailer portion 480 may mark the end of data packet 400. Data portion 450 may contain data payload to be carried in data packet 400. Header portion 410 may include information relating to control and identification of data packet 400, including an identification of the data packet, a length field, a source address, a destination address, a time-to-live (TTL) field, a service class or type of service field indicating the packet's priority relative to other data packets, a time marker, a cyclical redundancy code (CRC) field, a last-hop address, and a link field. The TTL field may indicate the number of hops data packet 400 is allowed to pass before the data packet is removed from the network traffic. The time marker may indicate an accumulated latency of data packet 400 updated at each hop as it traverses network 102, or if edge nodes 104-108 and/or network nodes 296-298 are time-synchronized (e.g., via the Global Position System, the Virtual Time Reference System, and the like), a time when data packet 400 was originally sent or first enters network 102. The time marker may be used independent of or in conjunction with the TTL field to aid in controlling throughput.

According to an aspect of the invention, the service class may indicate the level and type of service preferred or demanded by the type of data payload carried in data packet 400, relative to those in other data packets. Exemplary service classes may include, for instance, expedited forwarding for low-loss and low-latency services (e.g., for video teleconferencing, voice over Internet Protocol, and the like), best-effort forwarding for non-critical services (e.g., for web traffic, file transfer, electronic mail, and the like), assured forwarding (e.g., for remote caching, file transfer, electronic mail, and the like), etc. DiffServ and/or other network service classification techniques may be used to associate data packets with identifiable classes that enable an embodiment of the data dissemination protocol to transmit information while expending minimal or no network bandwidth.

Returning to FIG. 3, as data packets arrive at network node 300 via a communication link, a packet forwarding block 330 may perform route selection, source routing, packet label switching, and packet dropping based on information stored in or associated with the data packets. For example, packet forwarding block 330 may drop data packets that are determined to have expired based on their TTL values or time markers. From block 330, the data packets are forwarded to a class sorting block 340, where they are sorted in accordance to their priority based on their service classes.

According to an aspect of the invention, class sorting block 340 may forward the data packets via a communication link directly to one of queues 370a-n (e.g., priority queues, data queues, data packet queues, and the like) selected based on the data packets' service priority levels. According to another aspect of the invention as illustrated in FIG. 3, the class sorting block 340 may forward the data packets via a communication link to a congestion avoidance function set 360 of Random Early Drop (RED) and/or Biased Early Drop (BED) functions 360a-n associated with one of queues 370a-n. The data packets are selectively forwarded to one of RED/BED functions 360a-n in congestion avoidance function set 360 associated with one of queues 370a-n selected based on the data packets' service priority.

Each RED/BED function may drop some data packets as its associated queue fills up, either randomly or in a biased manner based on the projected cost required to successfully send the data packets to their intended destination node, to prevent overflow and consequent uncontrolled loss of the data packets. RED function utilizes a random discard policy designed to preempt data packet failure due to exceeding maximum allowable latency parameters and to reduce data loss due to packet discard caused by a full queue. BED function utilizes an alternative discard policy that discards data packets based on their higher projected costs (e.g., higher normalized routing costs) relative to the projected costs of the data packets already in and/or previously processed by the queue.

In accordance with an exemplary aspect of the invention, when a queue depth of the queue exceeds a threshold (e.g., 90 percent of the maximum queue size), the associated BED function automatically discards incoming data packets that have relatively higher projected cost compared to the projected cost of the data packets already in the queue. In accordance with another exemplary aspect of the invention, when the queue's depth exceeds a threshold, the associated BED function probabilistically discards incoming data packets based on the data packets' projected cost (e.g., normalized routing costs). Other methods of selecting a biased set of data packets to discard or retain may also be used. For more information on biased early drop algorithm, see Evans, S. C., Pearlman, M. R., Hartman, M. J., Rothe, A., Egan, M., and Leiva, M., "Route Based QoS and the Biased Early Drop Algorithm (BED)," QSHINE, published August 2005 by IEEE Computer Society, the entire contents of which are incorporated herein by reference.

According to another aspect of the invention, the data packets may be forwarded from class sorting block 340 to a triage biasing block slotted between class sorting block 340 and congestion avoidance function set 360. The triage biasing block may adjust the service priority of the data packets based on the estimated and/or projected cost associated with the data packets by taking into account network statistics and management information such as, for example, information associated with communication links and/or network nodes in network 102, which may include time to traverse a communication link, fault conditions of a network node or communication link, known congested communication links, and the like.

The triage-biased data packets may be modified or otherwise marked to indicate adjustments, if any, to their priority. For example, the triage-biased data packets may have one or more of their header fields (e.g., the service class, the link field, and the like) modified in accordance to their adjusted priority. This adjustment marking mechanism allows a receiving network node to properly decode information encoded in the sequence of the data packets sent by network node 300. For more information on triage biasing, see Evans, S. C., Liu, P., Hartman, M, Egan, M., and Weerakoon, I., "End-to-End QoS Through Distress Biased Services: A Triage Approach," MILCOM 2005, published October 2005, the entire contents of which are incorporated herein by reference.

The data packets are then forwarded to queues 370a-370n. Each queue contains only data packets of a given service priority. Queues 370a-370n may be classified according to their parameters, including, for example, guaranteed data rate, guaranteed average latency, guaranteed maximum latency, class type, capacity (i.e., maximum queue size), throughput, end-to-end delay, error rate, and the like. Queues 370a-n fill up to respective queue depths 375a-n, depending at least in part upon the number of high priority data packets relative to the number of low priority data packets. A queue servicing block 380 services the queues on a rotating basis. Queue set 370 may be used in conjunction with queue servicing block 380 to apply a data packet scheduling technique, such as Fair Queuing (FQ) and WFQ.

Both FQ and WFQ emulate Generalized Processor Sharing (GPS) to fairly share network bandwidth, by providing separate first-in, first-out (FIFO) queues (e.g., queues 370a-n) for statistically multiplexing one or more data flows of the network traffic. One or more of queues 370a-n may be assigned the task of processing one or more classes of the identifiably classified data packets in the network traffic.

In FQ with a network bandwidth of R, at any given time the FIFO queues may simultaneous process the network traffic having N active data flows at an average rate of R/N. WFQ, which is based on FQ, allows different queues to have different service shares (i.e., each queue has a statically or dynamically assigned weight) for controlling the QoS and to achieve guaranteed data rate. For example, in WFQ with a network bandwidth of R and having assigned weights $w_1, W_2, \ldots, W_N$ for N active data flows, one of the FIFO queues processes data flow number i at an average rate of $Rw_i/(w_1+W_2+\ldots+W_N)$. To some extent, WFQ increases the jitter in the data flow because multiple data packets of a service class are transferred in bursts. Exemplary aspects of the invention mitigate the bursty nature of WFQ by smoothing and making more random the selection of data packets having different service classes.

In general, in order to give priority to those queues containing the higher-priority data packets, queue servicing block 380 may dequeue (take packets from) a high-priority queue more often than from a low-priority queue. For example, queue servicing block 380 may service lower-priority queue 370c once for every three times it services high-priority queue 370a, and may service medium-priority queue 370b twice for each time it services lower-priority queue 370c. Similarly, queue servicing block 380 may service highest-priority queue 370a four times for every time it services lower-priority queue 370c and twice for each time it services medium-priority queue 370b. Many other techniques are known to service the queues so as to provide priority.

Thus, queue servicing block 380 receives packets from queue set 370 and sends them from the node by way of a communication interface 390. In operation of the arrangement of FIG. 3, lower priority classes of service have lower QoS, as for example are likely to have longer latency both at the individual node and overall through network 102. Class sorting block 340, congestion avoidance function set 360, queue set 370, and queue servicing block 380 combine to perform QoS that may dynamically adapt level of service for the data packets traversing network 102 based on updated information shared between network nodes 294-298. Such shared information includes, but are not limited to, route cost update, message acknowledgment, explicit congestion notification, network traffic statistics, and fault condition.

An exemplary aspect of the invention may extend a data packet scheduling technique, such as FQ or WFQ, to disseminate information while expending minimal or no network bandwidth by encoding and transmitting the information in a specific sequence of marked data packets or identifiable classes of data packets. A system overhead message block 305 generates a message (e.g., route cost update, acknowledgment, congestion notification, traffic statistics, fault condition, and the like) and forwards the message to a sequence code block 320. Sequence code block 320 may be configured by a configuration block 310.

According to an aspect of the invention, configuration block 310 may configure and/or control sequence code block 320 to encode messages from message block 305 over a specified window size (e.g., 4 data packets, 32 data packets, and the like) using an encoding strategy (e.g., a steganographic data dissemination strategy). Other configuration information includes, for example, exception handling (e.g., strategy for dealing with an empty queue), initiation sequence (e.g., when message encoding begins), termination sequence (e.g., when message encoding terminates), message format (e.g., whether messages are sent over sequences with bounded first packet and/or last packet for each message, or in a continuous sequence with no discrete first or last packet for each message), and the like.

Figure 6A:
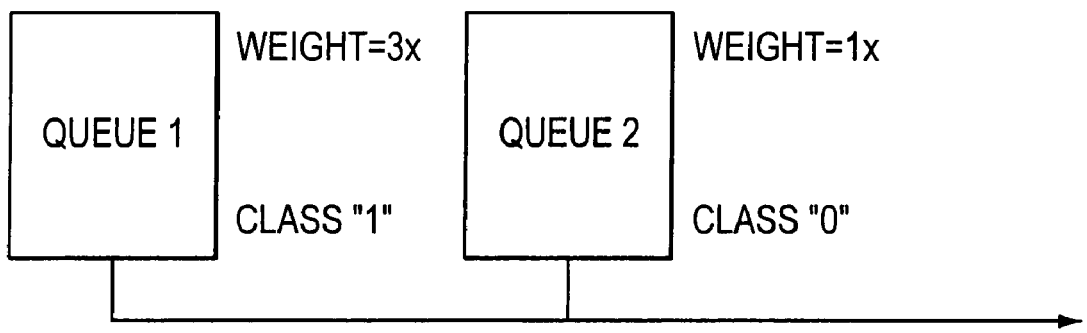
FIGS. 6A, 6B, and 6C illustrate exemplary encoding strategies for encoding messages in a sequence of data packets exchanged between network nodes in a network.
Figure 6B:
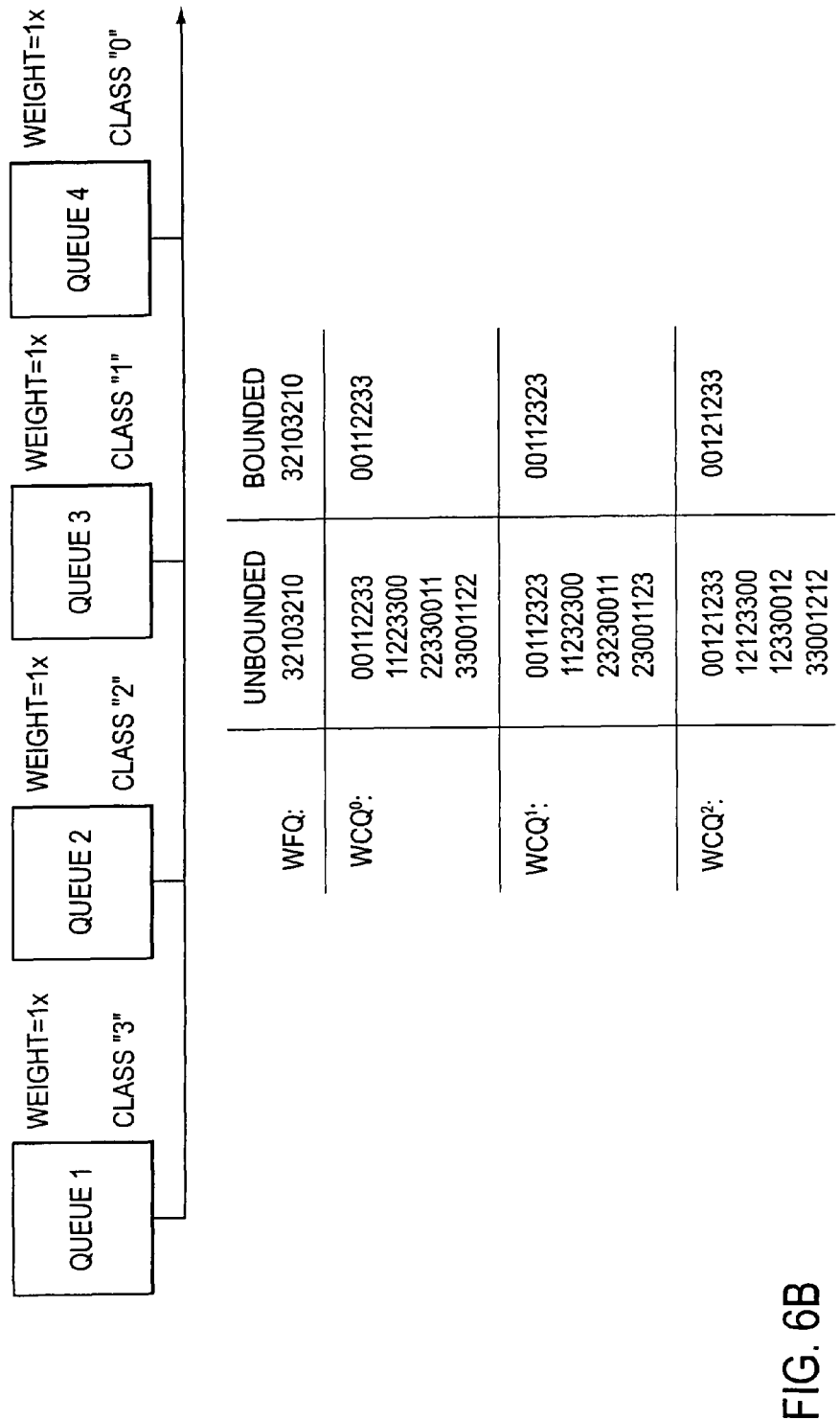
Figure 6C:
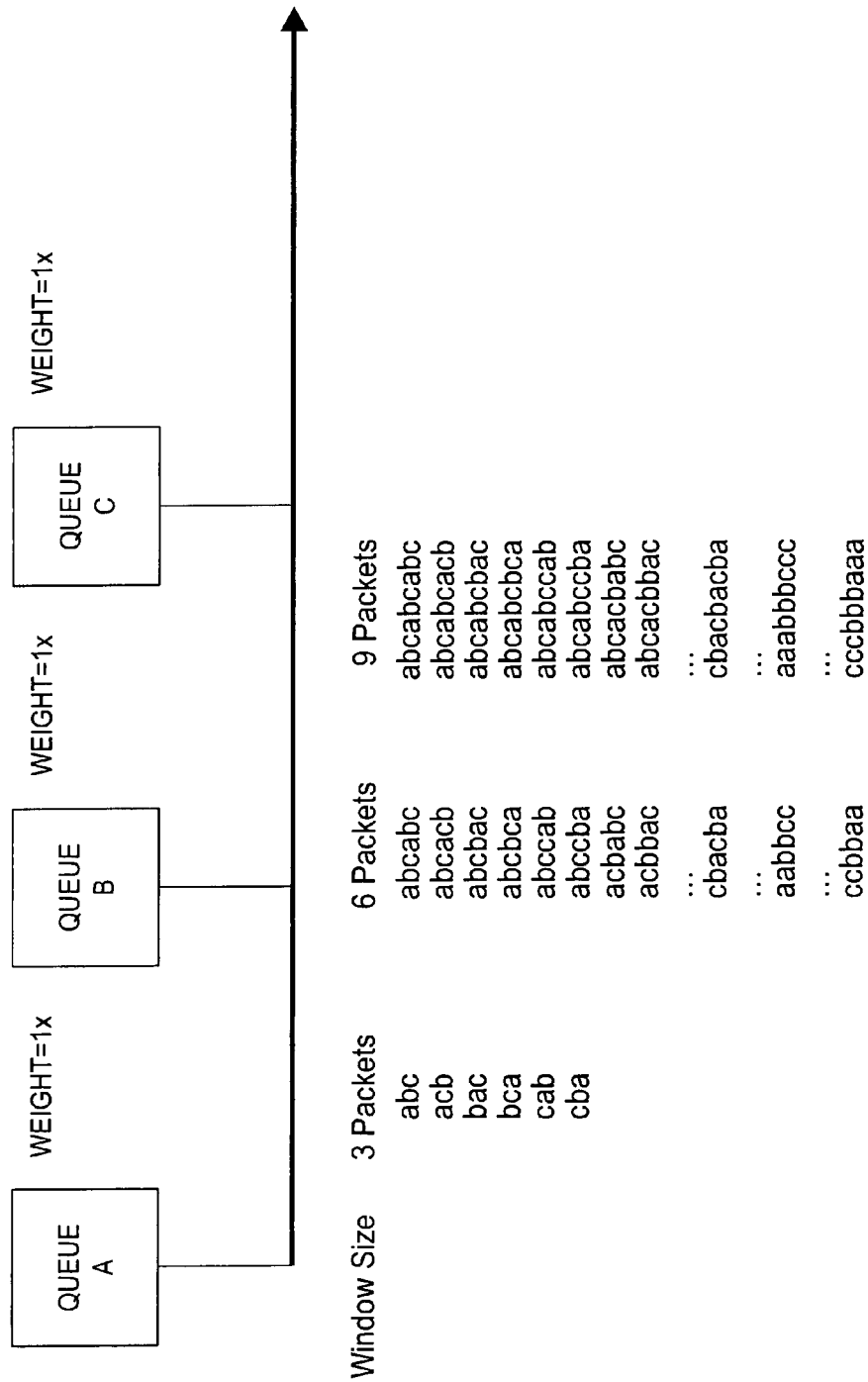

Configuration block 310 may communicate with other network nodes to determine whether those network nodes are capable of decoding messages from the sequence of the data packets, and to set up and/or store data dissemination strategies that include configuration parameters for encoding and decoding the messages with each of the capable network nodes. Thus, each of the network nodes that have agreed on a data dissemination strategy with network node 300 will be able to decode messages based on the sequence of data packets that it receives from network node 300. In exemplary embodiments as illustrated in FIGS. 6A, 6B, and 6C, the messages are encoded in sequences of symbols (e.g., service class identifiers and/or other markings) represented by, associated with, or otherwise stored in or along with the data packets.

Conversely, the network nodes that have not agreed with network node 300 on a dissemination strategy, including encoding and decoding configuration parameters, whether or not those network nodes are capable of decoding messages from the data packets' sequence, will not be able to decode messages from the sequence of data packets that they receive from network node 300. Further, the network nodes that have not agreed on encoding and decoding configuration parameters with network node 300 may not be aware that messages are encoded in the data packets' sequence.

This enables network node 300 to ensure that only intended recipient network nodes attempt to decode the encoded messages from network node 300. Thus, network node 300 may send covert, steganographic messages to only the network nodes that have agreed on steganographic data dissemination strategies with network 300, and if the exchanged data packets are intercepted by an unintended recipient, the unintended recipient is likely to be unaware of and/or unable to decode the steganographic messages encoded in the data packets' sequence.

Figure 5:
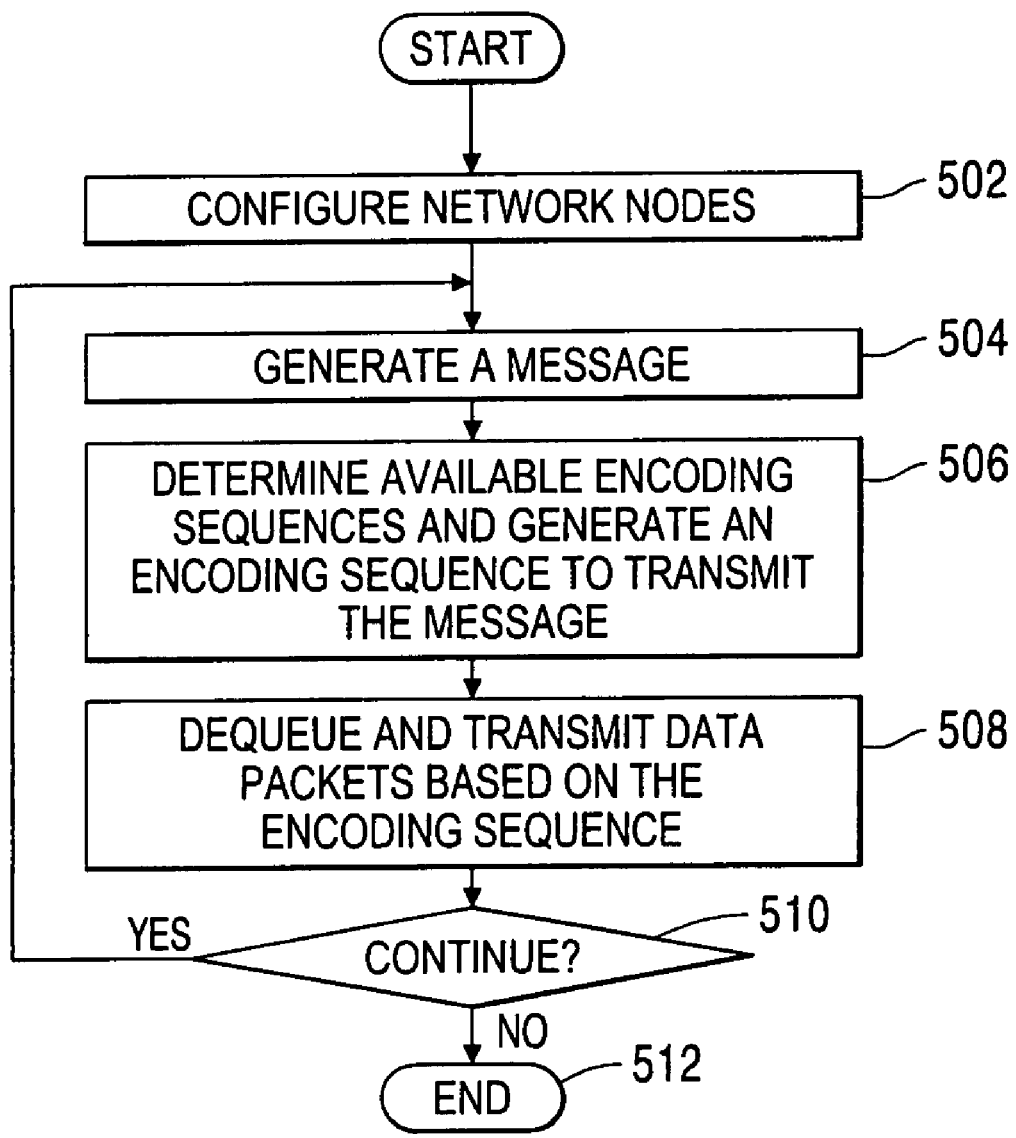
FIG. 5 is a flowchart outlining an exemplary process in accordance with the invention for encoding messages in a sequence of data packets exchanged between network nodes in a network.

After receiving a message from message block 305, sequence code block 320 directs queue servicing block 380 to service data packets from queues 370a-n in a sequence that encodes the message using an exemplary process illustrated in FIG. 5. Queue servicing block 380 then forwards the serviced data packets to communication interface 390, which processes (e.g., update the time marker field to accumulate the data packets' latency, decrement the TTL field, modify the last-hop address, and the like) and sends the serviced data packets to the next hop in network 102.

Figure 7:
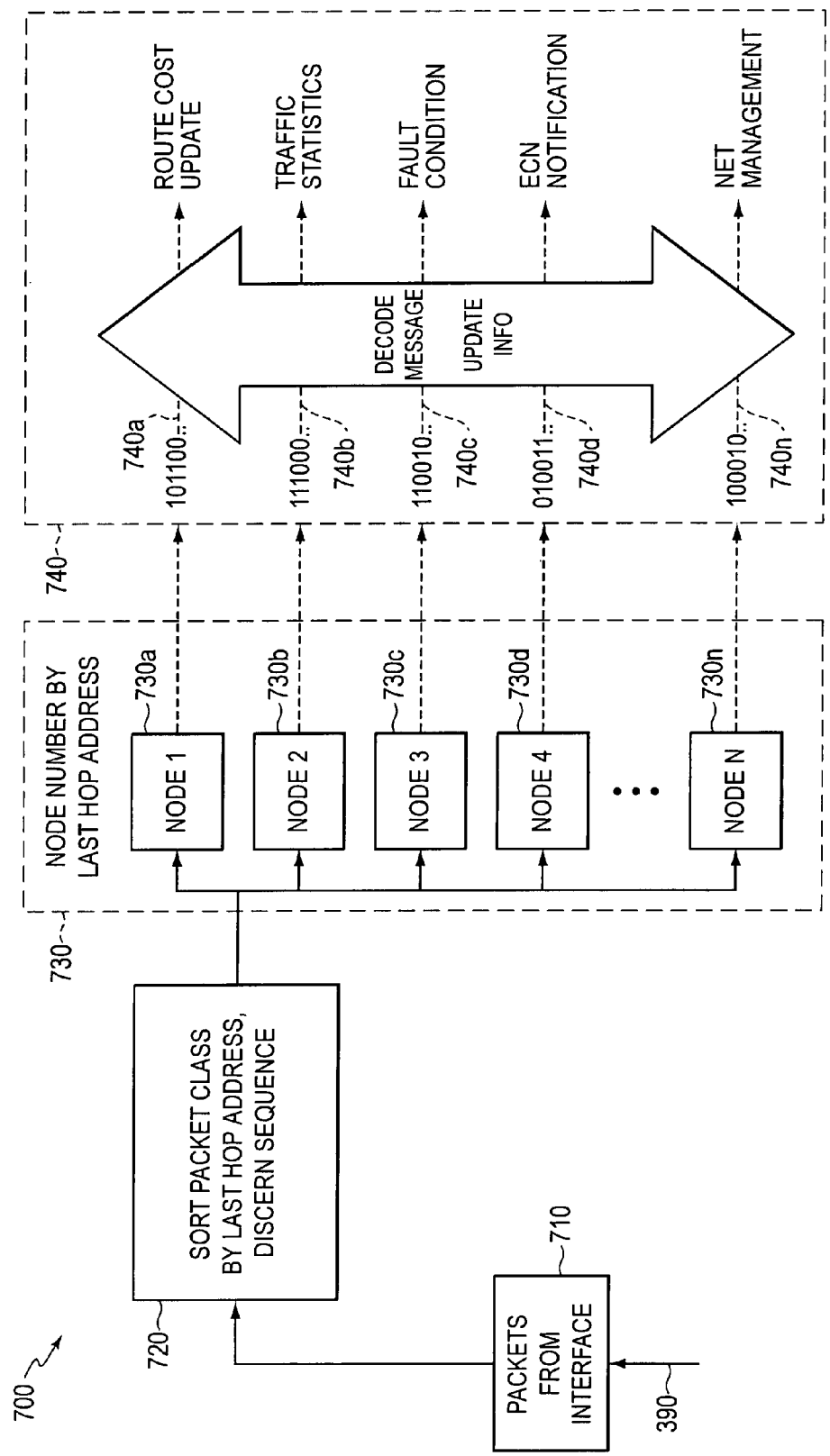
FIG. 7 illustrates a simplified block diagram of an exemplary network node in accordance with the invention for receiving data packets and decoding a message from the sequence of the received data packets.

FIG. 5 is a flowchart outlining an exemplary process of encoding messages in a sequence of data packets exchanged between network nodes in a network, thus disseminating the messages while requiring minimal or no network bandwidth. As shown in FIG. 5, the process begins at step 502 by configuring network nodes (e.g., core nodes 294-298 as shown in FIG. 2) in the network (e.g., network 102) to encode messages in the sequence of data packets exchanged between the network nodes. A sending node may negotiate with other network nodes (e.g., a receiving node 700 as shown in FIG. 7) to agree upon a configuration for disseminating information via messages encoded in the sequence of data packets by, for example, negotiating and agreeing on a specified window size (e.g., 8 data packets) and an encoding strategy. The network nodes may be pre-configured according to a standardized set or industry accepted protocol of configuration states. Exemplary encoding strategies are discussed in greater detail below in conjunction with FIGS. 6A, 6B, 6C, and 7.

The sending and receiving nodes may also negotiate and agree upon additional configuration parameters, such as exception handling (e.g., strategies for dealing with an empty queue), initiation sequence (e.g., when message encoding begins), termination sequence (e.g., when message encoding terminates), message format (e.g., whether messages are sent over bounded sequences with known first packet and/or last packet for each message, or in a continuous sequence that has no discrete first or last packet for each message), and the like.

Once the sending and receiving nodes have agreed on a set of configuration parameters, the nodes may disseminate information by encoding the information in the sequence of the exchanged data packets. The set of configuration parameters may be stored in the nodes' configuration block (e.g., configuration block 310). The negotiation and configuration process as shown in step 502 may be accomplished by a direct exchange of data via the data portion of the data packets. If the sending and receiving nodes are configured to disseminate information in the sequence of the exchanged data packets, the nodes may synchronously modify their configuration parameters with each other by negotiating using encoded messages in the sequencing of the data packets.

Next, in step 504, the sending node generates a message (e.g., an overhead message from system overhead message block 305 as shown in FIG. 3) to be encoded. The message includes shared information such as, but is not limited to, route cost update, message acknowledgment, explicit congestion notification, network traffic statistics, and fault condition.

The sending node may utilize one or more encoding strategies (e.g., data dissemination strategies, steganographic data dissemination strategies, and the like), such as exemplary traffic grammars illustrated in FIGS. 6A, 6B, and 6C. As noted above, encoded messages may be sent over bounded sequences with known first packet and/or last packet for each message, or over a continuous (i.e., unbounded) sequence with no discrete first or last packet for each message.

Returning to FIG. 5, the process then proceeds to step 506 where the sending node determines available encoding sequences based on the queues' depths (e.g., queue depths 375a-n) as well as the configuration parameters. For example, a sequence code block (e.g., sequence code block 320) may generate an encoding sequence from the encoding sequences determined to be available based on the encoding strategy, the specified window size (e.g., number of packets in an encoded sequence based on maximum averaging interval), the message format (e.g., bounded or unbounded), exception handling (e.g., use channel encoding techniques such as a 7/4 Hamming code and/or when a queue is empty, send a non-redundant overhead message marked as if from the empty queue, and the like), and the queues' depths and service provisions such as servicing weight, guaranteed data rate, guaranteed average latency, guaranteed maximum latency, class type, capacity (i.e., maximum queue size), throughput, end-to-end delay, error rate, and the like.

If any of queues 370$a$-$n$ becomes empty (i.e., one of queue depths 375$a$-$n$ reaches zero), the set of code-words available for sequence encoding may be reduced. Channel error coding techniques may be used to compensate for empty queues or packet losses. For example, a 7/4 Hamming code may be used to correct any single error in an encoded sequence. Thus, in an exemplary embodiment where the data traffic includes data packets from two service classes having equal service priorities, the sending node may send 4 bits of information via an encoded sequence of 7 data packets even if one of the data packets from one of the service classes is lost or otherwise discarded, dropped, or mistakenly identified as being sent from the other service class.

In another exemplary embodiment, if one of the sending node's queues 370$a$-$n$ becomes empty but is still allocated a service share of the network bandwidth, one or more explicit overhead messages may be sent instead when the sending node is scheduled to service the empty queue. This provides for maximum utilization of network bandwidth by sending overhead messages without penalizing other service classes that may be congested. Additionally, a boolean flag and/or a marker within the header of the explicit overhead messages may indicate that the messages are standing in proxy of data packets from the empty queue while allowing sequence encoding to continue.

In a further exemplary embodiment, the sending and receiving nodes may be configured to exchange messages encoded in bounded sequences (e.g., each message is encoded in a discrete sequence having a known first data packet and/or last data packet in the encoded sequence). If the sending and receiving nodes are configured to exchange messages encoded in bounded sequences, they may periodically synchronize with each other so that the receiving node may determine when the encoded sequences start or end. Thus, when the sending node encounters a condition where one or more of queues 370$a$-$n$ become empty or disproportionately loaded, the sending node may synchronize with the receiving node by sending encoded sequences that do not abide by the WFQ provisions (e.g., the priority distributions of the service classes determined based on guaranteed average latency, maximum latency, and the like).

Using an exemplary encoding strategy as illustrated in FIG. 6C, if a queue C is empty, a queue B is not empty, and a queue A is full, the sending node may send a synchronization message to the receiving node via an encoded sequence "aaaabbaaaabb" to notify the receiving node that the sending node will be sending messages encoded a sequence of six data packets (i.e., window size=6) starting immediate thereafter.

After the sending node generates the encoding sequence, the process proceeds to step 508 in which the sending node services queues 370$a$-$n$ according to the encoding sequence. A servicing block (e.g., servicing block 380) in the sending node may dequeue and transmit the data packets from the queues in an order based on the encoding sequence via an interface (e.g., communication interface 390) to the receiving node. The process then proceeds to step 510.

In step 510, the process may determine whether the sending node needs to transmit additional data packets and/or overhead messages to the receiving node. If the sending node needs to send additional data packets and/or overhead messages to the receiving node, the process may return to step 504. If the process determines in step 510 that the sending node does not needs to send additional data packets and/or overhead messages, the process may terminate itself in step 512.

FIG. 7 illustrates a simplified block diagram of an exemplary network node for receiving data packets and for decoding a message from the sequence of the received data packets. A receiving node (e.g., receiving node 700) may be any one of network nodes 294, 296, and 298 in network 102 or edge nodes 104-108 as shown in FIG. 2. FIG. 7 is described in connection with FIG. 8, which is a flowchart outlining an exemplary process for decoding messages based on a sequence of received data packets.

Figure 8:
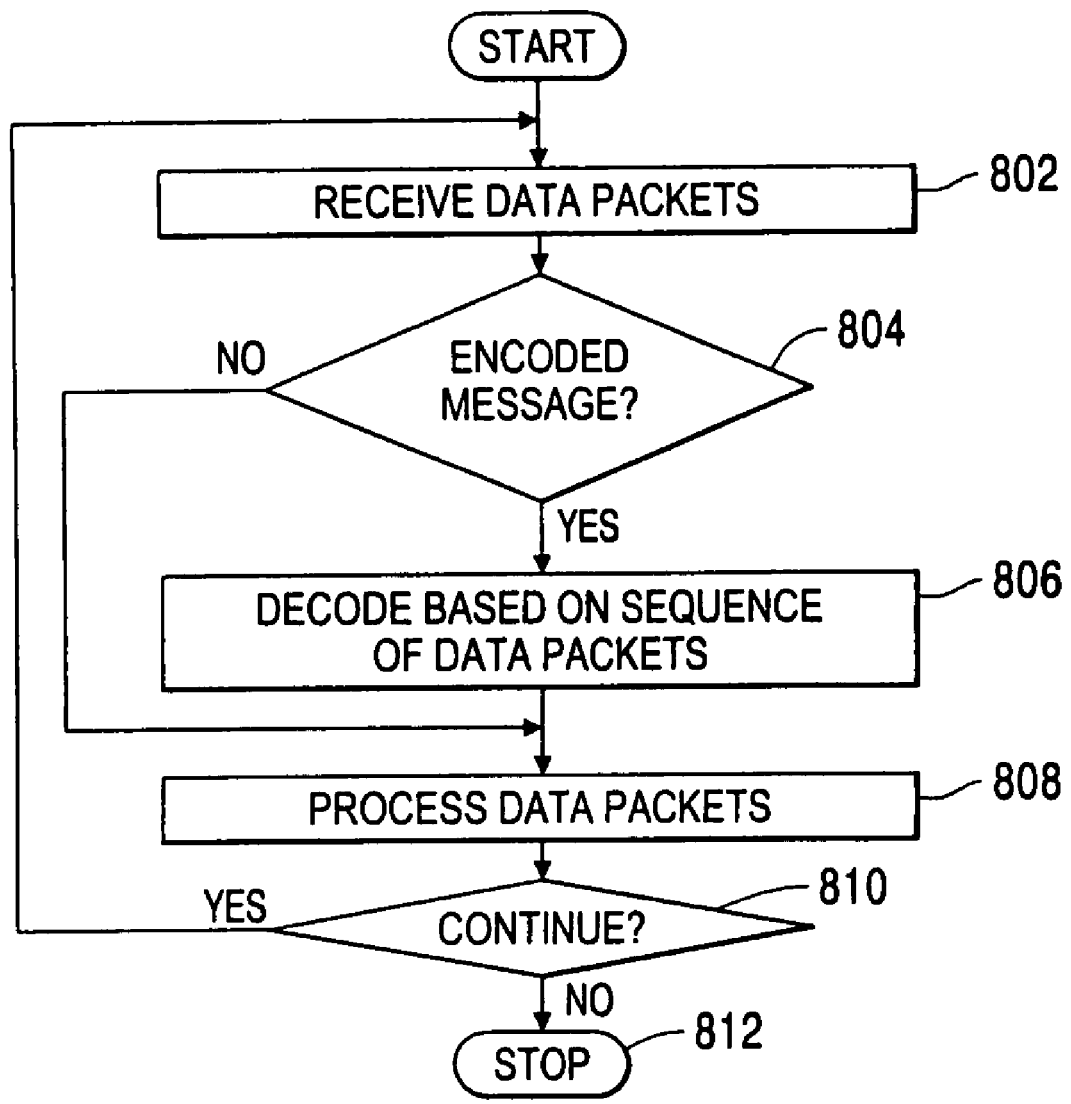
FIG. 8 is a flowchart outlining an exemplary process in accordance with the invention for decoding messages based on a sequence of received data packets.

As shown in FIG. 8, the message decoding process begins at step 802 when an interface (e.g., receiving interface 710) of the receiving node receives data packets from communication interface 390 of the sending node (e.g., network node 300 as shown in FIG. 3). The message decoding process may configure the receiving node by negotiating with the sending node to agree upon a configuration, such as an encoding strategy, so that the receiving node is able to decode messages encoded in the sequence of data packets. As described above, the receiving node may be pre-configured according to a standardized set or industry accepted protocol of configuration states.

Next, in step 804, the receiving node determines whether or not messages are encoded in the sequence of the received data packets. In an exemplary embodiment, the receiving node determines the existence of encoded messages by using a sorting block (e.g., sort and discern block 720) to sort the received data packets by their last hop address.

If in step 804 the receiving node determines that the received data packets contain encoded messages, the message decoding process proceeds to step 806 in which the sorting block sorts the received data packets by their sending nodes (e.g., sending nodes 730$a$-$n$) and discerns the sequence of the received data packets. A node lookup (e.g., a node lookup block 730) determines the received data packets' sending nodes based on their last hop addresses. Next, a decoder (e.g., a message decoding block 740) decodes messages encoded in the discerned sequence over a specified window size (e.g., 4 data packets, 32 data packets, and the like) and in accordance to other configuration information as described above.

The decoder decodes the messages by generating a sequence of symbols (e.g., service class identifiers and/or other markings) represented by, associated with, or otherwise stored in or along with the data packets, and comparing the sequence of symbols to the sequences in the encoding strategy agreed upon with the corresponding sending node. In an exemplary embodiment, a symbol sequence 740$a$ which begins with "101100" is received as a route cost update from the first sending node (e.g., sending node 730$a$), and a symbol sequence 740$b$ which begins with "111000" is received as a traffic statistics report from the second sending node (e.g., sending node 730$b$). Also consistent with the exemplary embodiment, a symbol sequence 740$c$ which begins with "110010" is received as a fault condition report from the third sending node (e.g., sending node 730$c$), a symbol sequence 740$d$ which begins with "010011" is received as an explicit congestion notification from the fourth sending node (e.g., sending node 730$d$), and a symbol sequence 740$n$ which begins with "10010" is received as a network management command and/or report from the nth sending node (e.g., sending node 730$n$).

Alternatively, if in step 804 the receiving node determines that the received data packets do not contain encoded message, the message decoding process skips to step 808 to process data stored in the data packets' data portions (e.g., a data portion 450 as shown in FIG. 4).

In step 810, the message decoding process may determine whether the receiving node needs to decode additional messages encoded in the sequence of the data packets sent by the sending nodes. If the receiving node needs to decode additional messages, the process may return to step 802. Alternatively, if the process determines in step 810 that the receiving node does not need to decode additional messages encoded in the sequence of the received data packets, the process may terminate itself in step 812.

Figure 9:
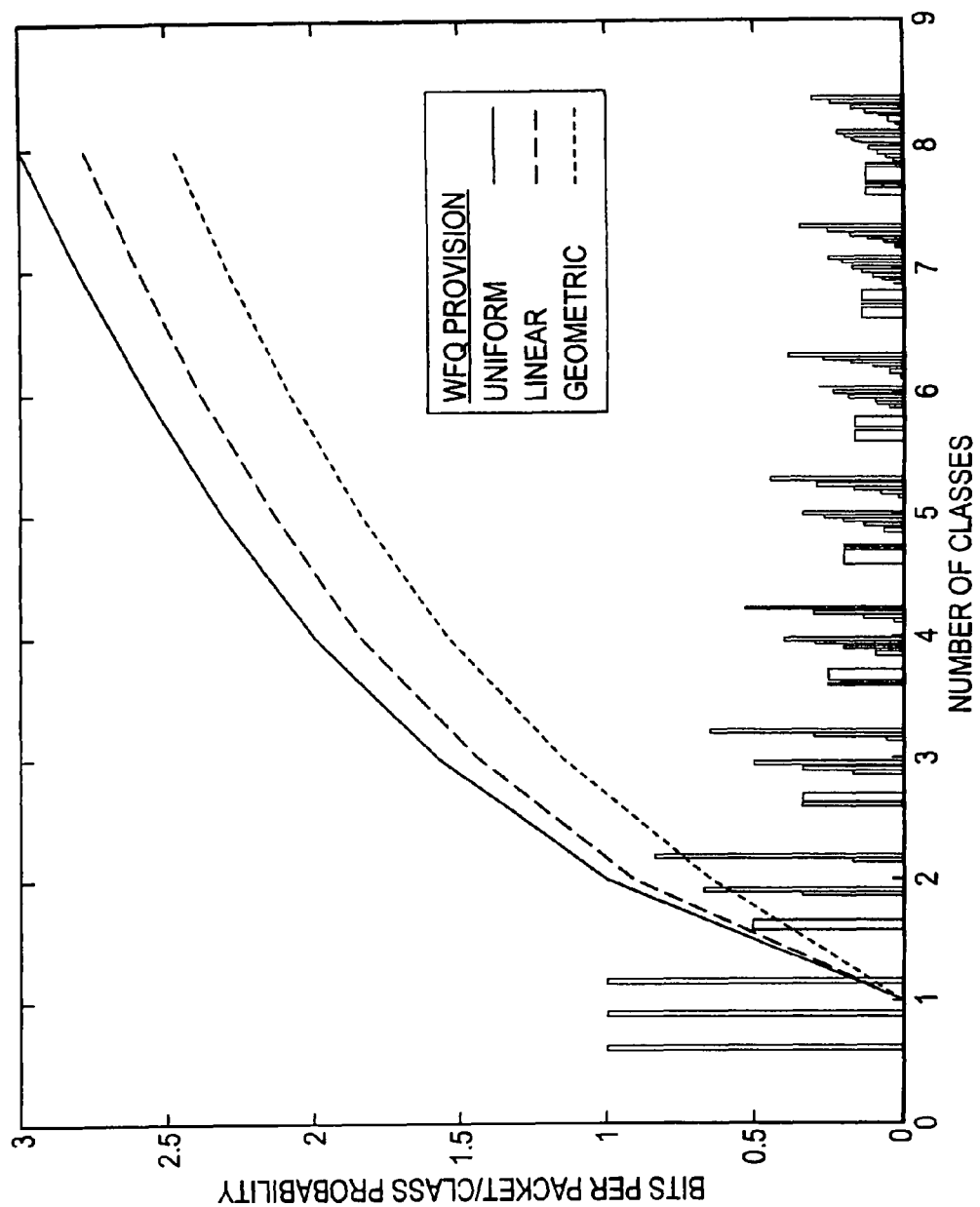
FIG. 9 is a graph illustrating the theoretical limit on the information transfer rate in an exemplary embodiment as a function of the number of bandwidth partitions allocated for service classes and the priority distributions of the service classes.

FIG. 9 illustrates H, which is the theoretical maximum amount of information transferable as a function of various partitions $p_i$ of bandwidth constrained by the priority distribution of N service classes. Theoretical limit on information transfer H may be determined using Formula 1.

$$H = -\sum_{i=1}^{N} p_i \log_2(p_i), \text{ where } \sum_{i=1}^{N} p_i = 1$$

Formula 1: Theoretical Limit on Information Transfer

Figure 10:
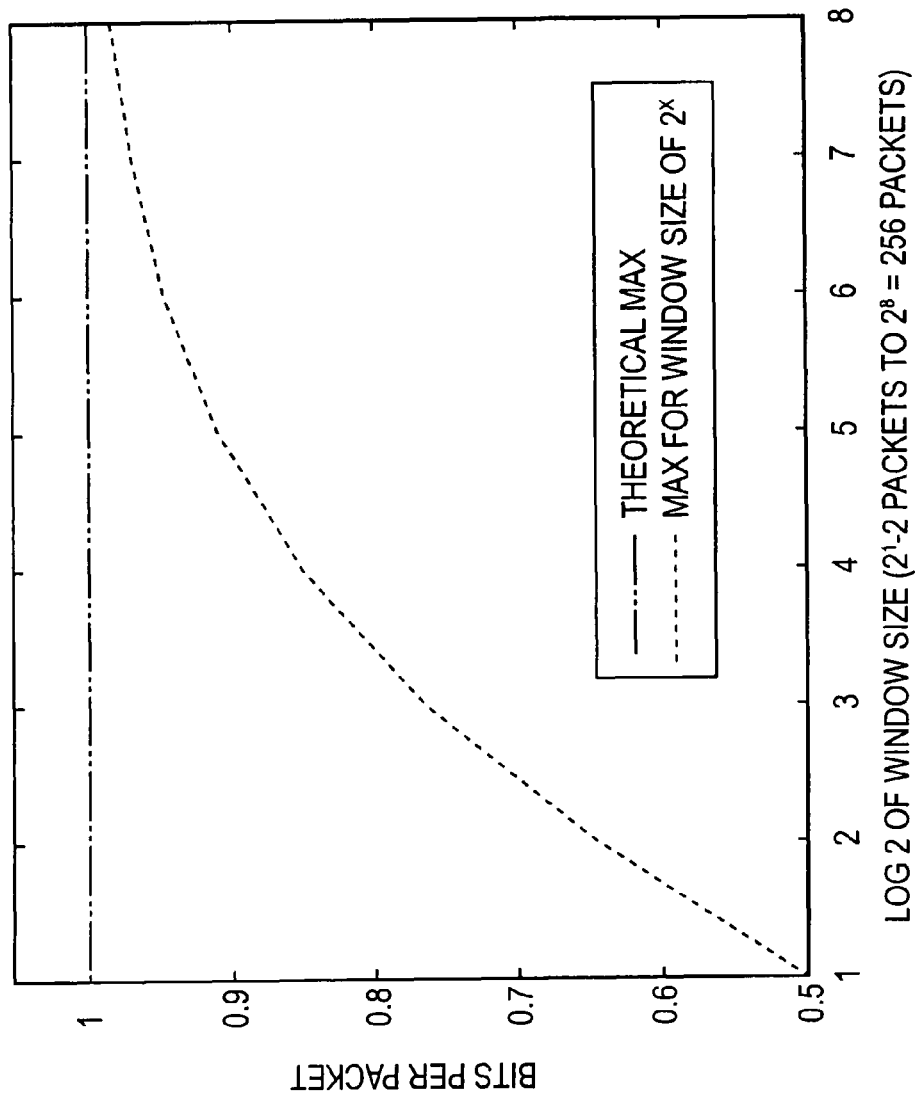
FIG. 10 is a graph illustrating the effect of window size of an encoded sequence on the practical information transfer rate in an exemplary embodiment having two service classes that have equal service priority.

Information transfer rate is maximized when the service priorities are equally distributed between N service classes, as shown in the solid curve for uniform service priority distribution. Information transfer rate decreases when the service priorities are linearly distributed, where each of N service classes has 1x, 2x, ..., Nx increments of service priority, are shown in the broken curve for linear service priority distribution. Still less information can be transferred when the service priorities are more disproportionately distributed, as shown in the dashed curve for geometric service priority distribution where each of N service classes has 1x, 2x, 4x, ..., $2^N x$ increments of service priority. As illustrated in FIG. 10, rate of information transfer via deliberate sequencing of data packets increases when the number of service classes N increases, regardless of service priority distribution.

FIG. 10 shows the effect of window size (e.g., number of packets in an encoded sequence based on maximum averaging interval) of an encoded sequence on the practical information transfer rate in an exemplary embodiment having two service classes that have equal service priority. As the window size increases, the rate of information transfer increases toward the theoretical maximum as shown in FIG. 10. While H, the theoretical maximum of information transferable, may be computed using Formula 1, the practical information transfer rate is constrained by the number of code-words enumerated in the set of possible code-words, which is a function of the window size. For example, having a window size of two packets limits the encoded sequence to two code-words: 10 and 01. Therefore, a bit of information may be encoded with every two packets. As the window size increases, the number of possible code-words for the encoded sequence increases exponentially. For example, three bits of information may be encoded with every four packets at a window size of 23 packets, or an average of one bit for every 1.33 packet or 0.75 bit per packet.

Figure 11:
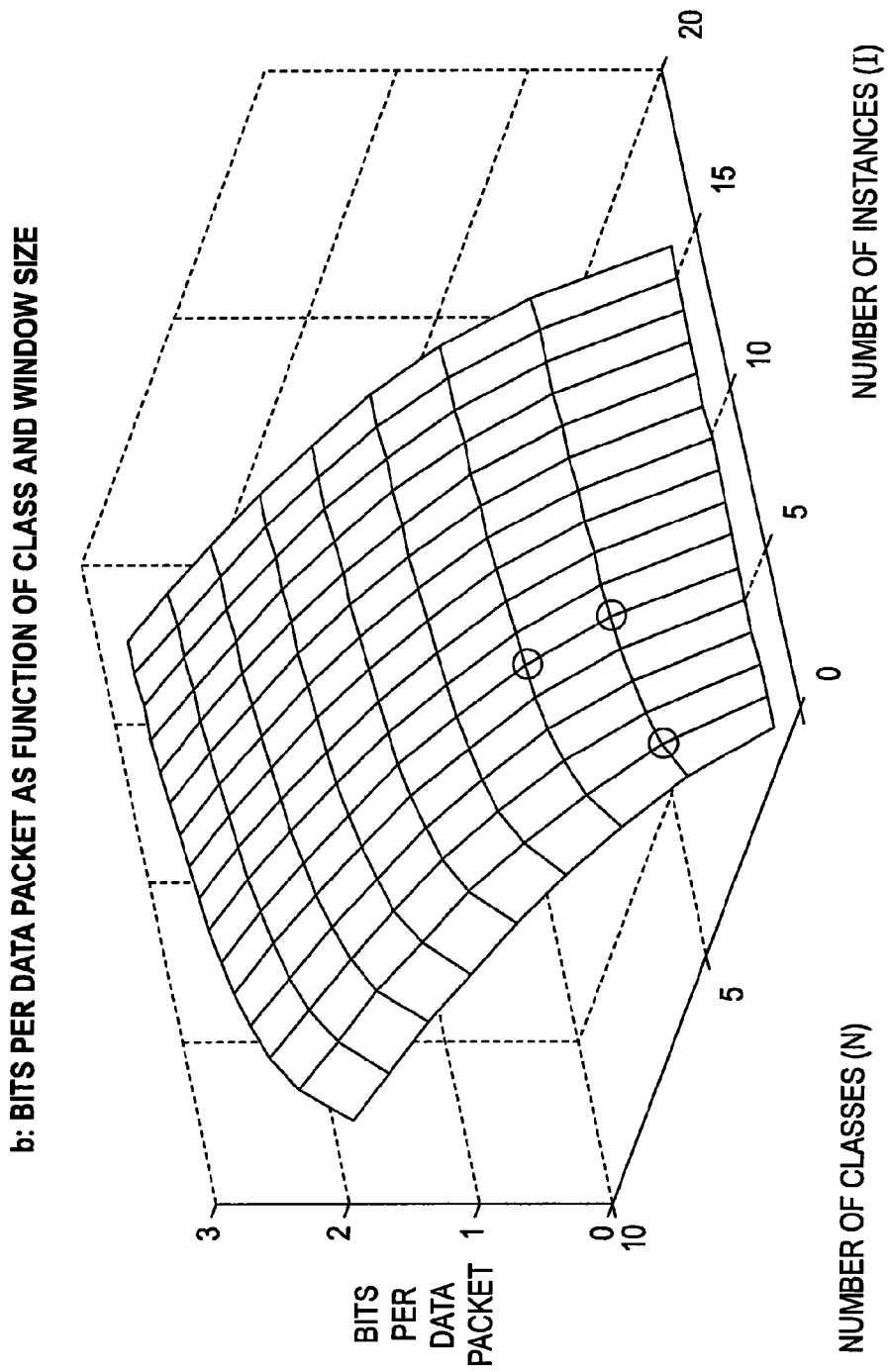
FIG. 11 is a graph illustrating the amount of information transferable per data packet as a function of the number of service classes and the window size of an encoded sequence.

FIG. 11 illustrates the amount of information transferable per data packet as a function of the number of service classes and the number of instances of code-words available for each encoded sequence. A number of instances I of code-words available for sequence encoding is a function of both window size W and an alphabet size. In an exemplary embodiment, the alphabet size corresponds to number of service classes N.

While the theoretical maximum number of instances I=NW, in the exemplary embodiment, the practical maximum number of instances I may be lower than the theoretical maximum. Because service classes N have corresponding service priority shares $m_1, m_2, \ldots, m_N$, which determine the number of times each of N service classes is serviced to generate an encoding sequence having window size W, practical number of instances I is constrained by the number of code-words enumerated in the set of possible code-words that also satisfies service priority shares $m_1, m_2, \ldots, m_N$. Practical number of instances I may be determined using Formula 2.

$$I = \frac{W!}{m_1! m_2! \ldots m_N!}, \text{ where } \sum_{i=1}^{N} m_i = W$$

Formula 2: Number of Instances Available for Sequence Encoding

Using the above formulas for calculating number of instances I, the amount of information transferable per data packet (e.g., bits of data disseminated in encoding sequences per data packet) may be estimated based on number of service classes N and number of instances I of code-words available for sequence encoding. Table 1 illustrates the estimated amount of information transferable per data packet as a function of the number of service classes and the number of instances available for sequence encoding.

TABLE 1

Effect of Number of Service Classes and Instances on Information Transfer Rate

| Service Classes N | Instances I | Bits per Data Packet |
|---|---|---|
| 2 | 1 | .5 |
| 2 | 2 | .65 |
| 2 | 6 | .82 |
| 3 | 1 | .86 |
| 3 | 2 | 1.08 |
| 3 | 6 | 1.34 |

Figure 12:
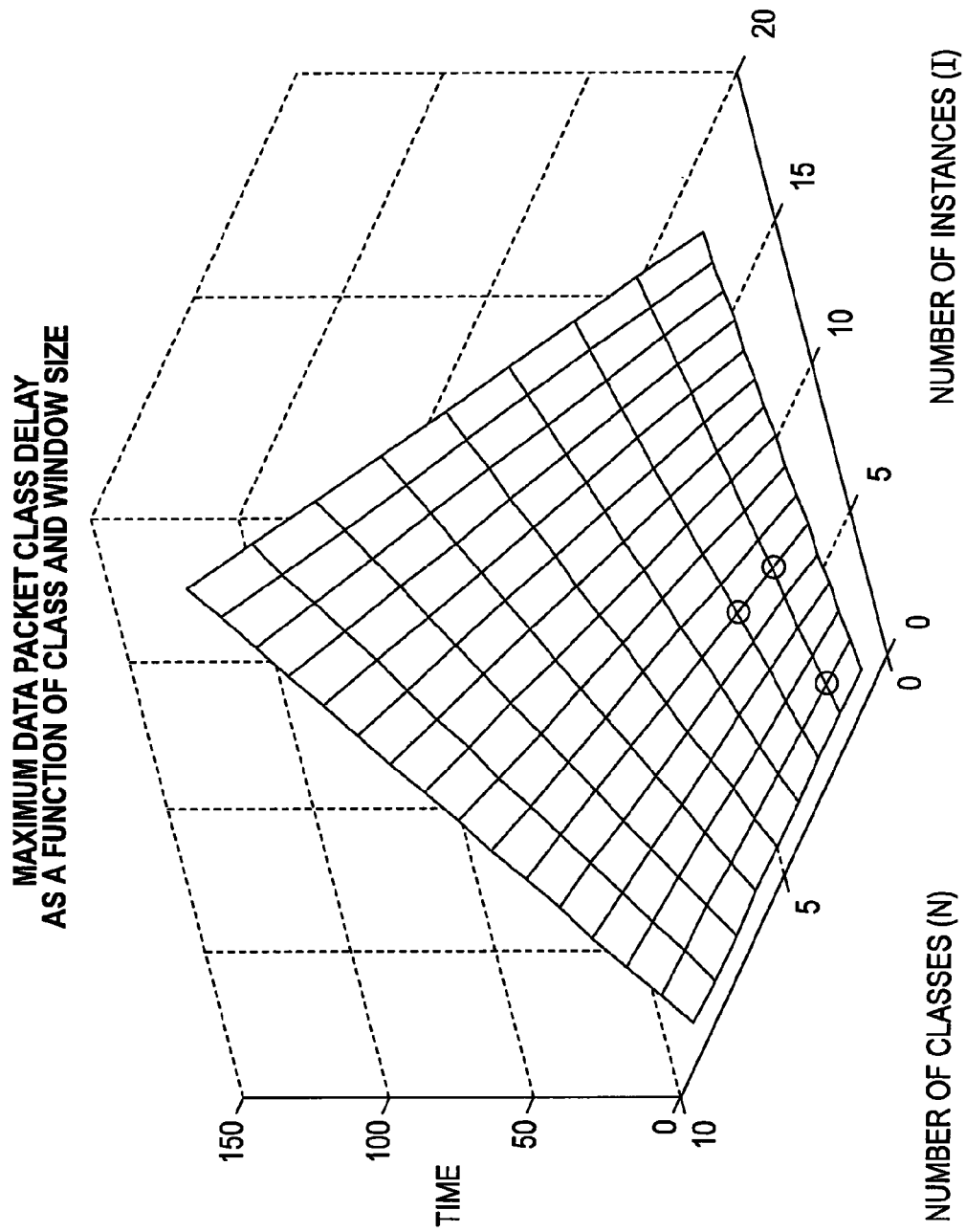
FIG. 12 is a graph illustrating the maximum data packet delay in an exemplary embodiment as a function of the number of service classes and the window size of an encoded sequence.

As shown in the above-described exemplary embodiments, increasing the window size for sequence encoding increases the information transfer rate, but may also lead to increased delay in transferring data packets and increased variation in the sequence of transferred data packets, depending on the data packet arrival rates and the distribution of data packets for the service classes. FIG. 12 illustrates maximum data packet delay in an exemplary embodiment estimated based on the number of service classes and the number of instances of code-words available for each encoded sequence. As described above, number of instances I of code-words available for sequence encoding is a function of both window size W and an alphabet size, which may correspond to number of service classes N. As shown in FIG. 12, increasing number of instances I and/or number of classes N may increase jitter in the data flow for one or more service classes N.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described embodiment includes software, but the present invention may be implemented as a combination of hardware and software or in hardware alone. Further, while certain exemplary methods have been described, it will be appreciated that the order of the method may be rearranged and stages or steps may be substituted, modified, combined or otherwise altered.

The systems and methods disclosed herein may be embodied in various forms including, for example, a data processor, such as a computer that also includes a database, digital electronic circuitry, firmware, software, or combinations thereof. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, such as a computer program tangibly embodied in an information storage medium, e.g., in a machine readable storage device for execution by or to control the operation of data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Further, while this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of disseminating information, between at least a sending node and a receiving node, via a plurality of data packets, comprising:
   receiving the plurality of data packets;
   sorting the data packets based on at least a class of the data packets;
   encoding an additional data by sequencing the data packets based on encoding strategies negotiated between the sending and receiving nodes, the additional data being the information, which is encoded in the sequence of the data packets, wherein the sequence is compatible with the class; and
   disseminating the information by transmitting the data packets in the sequence.

2. The method according to claim 1, further comprising:
   selecting a sequence of markers from a predefined set of markers for each of the data packets based on the received data packets, wherein the sequence of markers encodes the received data packets.

3. The method according to claim 2, further comprising:
   receiving the transmitted data packets;
   discerning a transmission sequence of the received data packets; and
   determining the disseminated information based on the transmission sequence of the data packets.

4. The method according to claim 3, wherein determining the information includes decoding the received data packets based on a sequence corresponding to the transmission sequence of the data packets.

5. The method according to claim 3, further comprising:
   configuring a steganographic dissemination strategy based on the predefined set of markers,
   wherein
   the step of selecting the sequence of markers further includes selecting the sequence of markers in accordance to the steganographic dissemination strategy; and
   the step of determining further includes determining the information based on the steganographic dissemination strategy.

6. The method according to claim 1, further comprising:
   establishing a plurality of queues, where each of the queues is associated with one of the classes of the data packets and services, one or more data packets each having a marker that corresponds to the class;
   dequeuing the data packets from the queues in accordance to a dequeuing order determined based in part on the sequence and the class associated with each of the queues, wherein the sequence includes markers that correspond with the class; and
   transmitting dequeued data packets based on the sequence and the marker of each of the dequeued data packets.

7. The method according to claim 6, further comprising:
   configuring a steganographic dissemination strategy based on a predefined set of markers; and
   selecting a sequence of markers from the predefined set of markers based on the received data packets and in accordance to the steganographic dissemination strategy, wherein the encoding sequence encodes the received message.

8. The method according to claim 6, wherein the step of transmitting further includes transmitting the dequeued data packets based on the dequeuing order of the dequeued data packets.

9. The method according to claim 6, wherein the step of dequeuing further comprises dequeuing the data packets from the queues in accordance to at least one parameter of the queues independent of the received data packets.

10. The method according to claim 9, wherein the parameter of the queues is one of a queue depth, a guaranteed data rate, a guaranteed time average, a class type, a capacity, a throughput, an end-to-end delay, and an error rate.

11. A method for disseminating a message, between at least a sending node and a receiving node, using a plurality of queues, the method comprising:
   establishing the plurality of queues for a plurality of data packets, where each of the queues is associated with a class selected from a plurality of classes each having a distinct class identifier;

enqueuing data packets into one of the queues selected based on a class associated with the data packets to be enqueued;

encoding an additional data by sequencing the data packets based on encoding strategies negotiated between the sending and receiving nodes, the additional data being the message encoded in the sequence of the data packets, wherein the sequence is compatible with the class of the data packets; and dequeuing the queued data packets from the queues based in part on the sequence.

12. The method of claim 11, wherein the message includes one of a route cost, a route cost update, an acknowledgment, a congestion notification, traffic statistics, and a fault condition.

13. The method of claim 11, wherein dequeuing the queued data further comprises:

dequeuing the queued data packets from the queues based on at least one parameter of the queues, wherein the parameter is one of a queue depth, a guaranteed data rate, a guaranteed time average, a class type, a capacity, a throughput, an end-to-end delay, and an error rate.

14. The method of claim 13, wherein the queues are classified in accordance to differentiated services and each of the queues is associated with a service class.

15. An apparatus that disseminates a message between nodes of a network, comprising:

a plurality of data packets, each of the packets having class:

an input portion that receives the data packets that are to be transmitted from a first node to at least one other node in the network; and a transmitter that is coupled to the input portion, where the transmitter receives the data packets from the input portion and transmits the data packets in a sequence that represents an additional data that is the message from the first node to the at least one other node in the network, the message being encoded in the sequence of the data packets, wherein:

the first node negotiates with the at least one other node in the network to determine encoding strategies and encode the message by sequencing the data packets based on the encoding strategies wherein the sequencing is compatible with the classes of the data packets.

16. The apparatus according to claim 15, further comprising:

a sequence coder coupled between the input portion and the transmitter, where the sequence coder selects a sequence of markers from a predefined set of markers that represents the received data packets.

17. The apparatus according to claim 16, further comprising:

a receiver that receives the transmitted data packets, where the receiver discerns a transmission sequence of the received data packets and determines the message based on the transmission sequence of the data packets.

18. The apparatus according to claim 17, wherein the receiver decodes the received message based on a sequence of the markers of the data packets in the transmission sequence.

19. The apparatus according to claim 17, further comprising:

a configuration portion that configures a steganographic dissemination strategy based on the predefined set of markers, wherein the sequence encoder selects the sequence of markers in accordance to the steganographic dissemination strategy; and the receiver determines the message based on the steganographic dissemination strategy.

20. The apparatus according to claim 15, further comprising:

a plurality of queues, where each of the queues is associated with a class and services, one or more data packets each having a marker that corresponds to the class; and a queue servicing portion that dequeues the data packets from the queues in accordance to a dequeuing order determined based in part on the sequence and the class associated with each of the queues, wherein the transmitter transmits dequeued data packets to the at least one other node based on the sequence and the marker of each of the dequeued data packets.

* * * * *